(12) United States Patent
Watanabe

(10) Patent No.: US 7,038,152 B2
(45) Date of Patent: May 2, 2006

(54) PORTABLE COMMUNICATION UNIT

(75) Inventor: Yohsuke Watanabe, Minato-ku (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 10/143,771

(22) Filed: May 14, 2002

(65) Prior Publication Data
US 2002/0168948 A1 Nov. 14, 2002

(30) Foreign Application Priority Data
May 14, 2001 (JP) .............................. 2001-142635

(51) Int. Cl.
H01H 9/00 (2006.01)
(52) U.S. Cl. ...................................... 200/314; 200/317
(58) Field of Classification Search ................ 200/317, 200/314, 5 A
See application file for complete search history.

(56) References Cited

U.S. PATENT DOCUMENTS

| | | | |
|---|---|---|---|
| 4,343,975 A * | 8/1982 | Sado .......................... 200/314 |
| 4,636,593 A | 1/1987 | Novak et al. ................ 200/5 A |
| 4,885,443 A * | 12/1989 | Simcoe et al. .............. 200/314 |
| 5,664,667 A * | 9/1997 | Kenmochi .................. 200/314 |
| 5,734,136 A | 3/1998 | Newcomer et al. ......... 200/5 A |

FOREIGN PATENT DOCUMENTS

| | | | |
|---|---|---|---|
| CN | 1282087 A | | 1/2001 |
| EP | 0 432 547 A2 | | 6/1991 |
| GB | 2066575 A | * | 7/1981 |
| JP | 62-124897 U | | 8/1987 |
| JP | 3-58829 U | | 6/1991 |
| JP | 8-9448 A | | 1/1996 |
| JP | 11-331333 A | | 11/1999 |
| JP | 2000-209314 A | | 7/2000 |
| JP | 2000-270063 A | | 9/2000 |

* cited by examiner

Primary Examiner—Kyung Lee
(74) Attorney, Agent, or Firm—Sughrue Mion, PLLC

(57) ABSTRACT

A key sheet provided with a plurality of buttons formed thereon, a metal dome sheet, and a printed board are incorporated in a stacked state into a lower body provided with an upper case and a lower case. A plurality of protrusions for internally supporting the upper case are provided on the key sheet. By virtue of the above construction, even when external pressure is applied to the upper case, the upper case is supported by the plurality of protrusions to prevent the upper case from being deformed or curved, and buttons can be prevented from being pushed by the upper case. Therefore, a portable communication unit can be realized which can reduce size and weight without increasing the number of components and can protect the body and electronic components, for example, against impact and external pressure.

8 Claims, 6 Drawing Sheets

PORTABLE COMMUNICATION UNIT

FIELD OF THE INVENTION

The invention relates to a portable communication unit and particularly to a portable communication unit which can prevent deformation or curving of the case of the communication unit upon the application of impact, external pressure and the like to the body of the portable communication unit and in its turn can prevent erroneous operation attributable to accidental key depression.

BACKGROUND OF THE INVENTION

A reduction in size and weight has been required of portable communication units typified by portable telephones (cellular phones) from the viewpoint of improving the portability. The reduction in size and weight of the portable communication units is generally realized by reducing the size and weight of components used and, in addition, by reducing the thickness of the body. Reducing the thickness of the body, however, unavoidably leads to lowered strength of the body. Further, reducing the thickness of the body is likely to cause deformation or curving of the body which often causes the depression of a key(s) resulting in erroneous operation, for example, turning-off of power supply, turning-on of power supply, or calling. Various proposals have hitherto been made with a view to solving these problems.

FIG. 1 shows a first example of the conventional portable communication unit disclosed in Japanese Utility Model Laid-Open No. 124897/1987. This portable communication unit aims to reduce the thickness without requiring high strength to the body. In the portable communication unit, a metallic shield plate 102 is disposed on the backside of a printed board 101, and the shield plate 102 and the printed board 101 are fixed to a unit case 103 by a screw 104.

FIG. 2 shows a second example of the conventional portable communication unit disclosed in Japanese Utility Model Laid-Open No. 058829/1991. A mounting substrate 201 is built in a unit body 205, and a switch button 202 is mounted on the mounting substrate 201. An elastic member 204 is interposed between the underside of the switch button 202 and the mounting substrate 201. The switch button 202 comprises a movable part 203a and a fixed part 203b. The fixed part 203b is fixed to the mounting substrate 201. The movable part 203a is provided so as to face the fixed part 203b. The movable part 203a in its bottom periphery is held by the elastic member 204. In the ordinary state, the elastic member 204 functions to separate the movable part 203a from the fixed part 203b. As soon as the movable part 203a is pressed down against the elastic force of the elastic member 204, the switch button 202 is turned on. By virtue of the provision of the elastic member 204, even when the switch button 202 is vibrated as a result of the application of impact to the unit body 205, the elastic member 204 absorbs the load of the switch button 202 and, thus, the erroneous operation of the button switch 202 can be prevented.

Japanese Utility Model Laid-Open No. 9448/1996 discloses a construction wherein a cushioning material such as silicone rubber is provided on the outer surface of a case body. According to this construction, even when the portable telephone has been dropped, the case or the internal mechanism is not broken. Likewise, Japanese Patent Laid-Open No. 331333/1999 discloses a construction wherein a cushioning material is provided between the inner wall of a case and a printed board. According to this construction, deformation caused by the application of a load or an impact to the case is less likely to affect the printed board, and the separation of mounted components or contact failure can be prevented.

Japanese Patent Laid-Open No. 209314/2000 discloses a construction wherein a rib is provided so as to pass through a key operating part and a printed board to permit the printed board and the like to be vertically moved along the rib. According to this construction, even when external force is applied to the case, the printed board and electronic components can be protected against impact and the like. Further, Japanese Patent Laid-Open No. 270063/2000 discloses a construction wherein a reinforcing member is provided along one side of an opening for a liquid crystal display in a front case According to this construction, even when external force is applied to the front case in its portion around the liquid crystal display, damage to the liquid crystal display can be prevented.

The conventional portable communication units, however, have the following drawbacks. Specifically, in the construction disclosed in Japanese Utility Model Laid-Open No. 124897/1987, the use of the metallic shield plate results in increased thickness and weight, and, in addition, the increased number of components leads to an increase in cost. In the construction disclosed in Japanese Utility Model Laid-Open No. 058829/1991, the deformation of the case unavoidably causes erroneous operation of the button switch.

In the construction disclosed in Japanese Utility Model Laid-Open No. 9448/1996, the contemplated effect can be attained in only the portion where the cushioning material is provided. In the construction disclosed in Japanese Patent Laid-Open No. 331333/1999, the use of the cushioning material reduces utilizable space within the unit body, and, thus, the mounting space, which is originally small, is further reduced. The technique disclosed in Japanese Patent Laid-Open No. 209314/2000 can be applied to internally provided printed board and electronic components. This technique, however, cannot be applied to button switches. In the construction disclosed in Japanese Patent Laid-Open No. 270063/2000, the necessity of providing the reinforcing member increases the necessary number of components and, at the same time, reduces mounting space. Further, the effect attained by the provision of the reinforcing member covers only the liquid crystal display.

SUMMARY OF THE INVENTION

Accordingly, it is an object of the invention to provide a portable communication unit which can realize a reduction in size and weight without increasing the number of components and can protect the body and electronic components of the communication unit against impact, external pressure and the like.

According to the first feature of the invention, a portable communication unit comprises: a body comprising an upper case and a lower case; a key sheet, provided with a plurality of push buttons, and a printed board, said key sheet, provided with the plurality of push buttons, and the printed board being incorporated into the body; and openings, for exposing the operating part of the plurality of push buttons, being provided in the upper case, said key sheet being provided with a plurality of protrusions for supporting the upper case.

According to this construction, since a plurality of protrusions provided in the key sheet support the upper case of the body, even when external pressure is applied to the upper case, the upper case is not deformed. Since the upper case is not deformed, the upper case does not deform the button part. Since the button part is not deformed, the button part does not come into contact with a metal dome. Therefore, erroneous operation of the key does not occur. Thus, the body and the electronic components can be protected, for example, against impact and external pressure without the necessity of providing an additional component or using a highly rigid material in the body, and the reliability can be improved while realizing a reduction in size and weight.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

Figure 1:
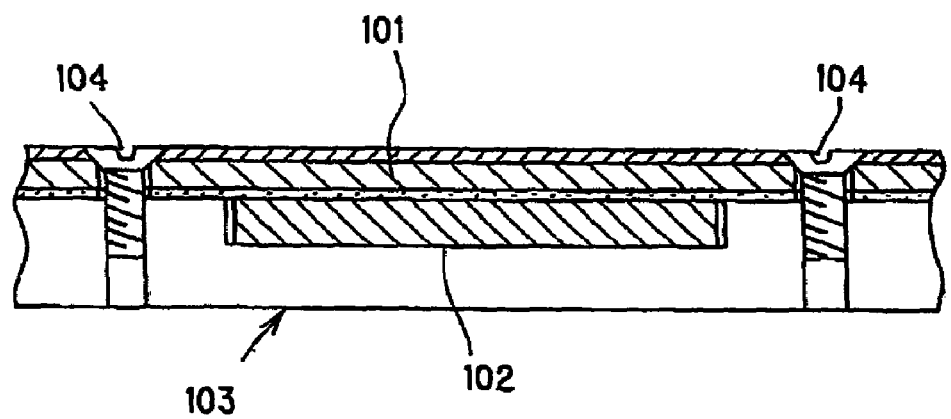
FIG. 1 is a cross-sectional view showing a first example of the conventional portable communication unit.
Figure 2:
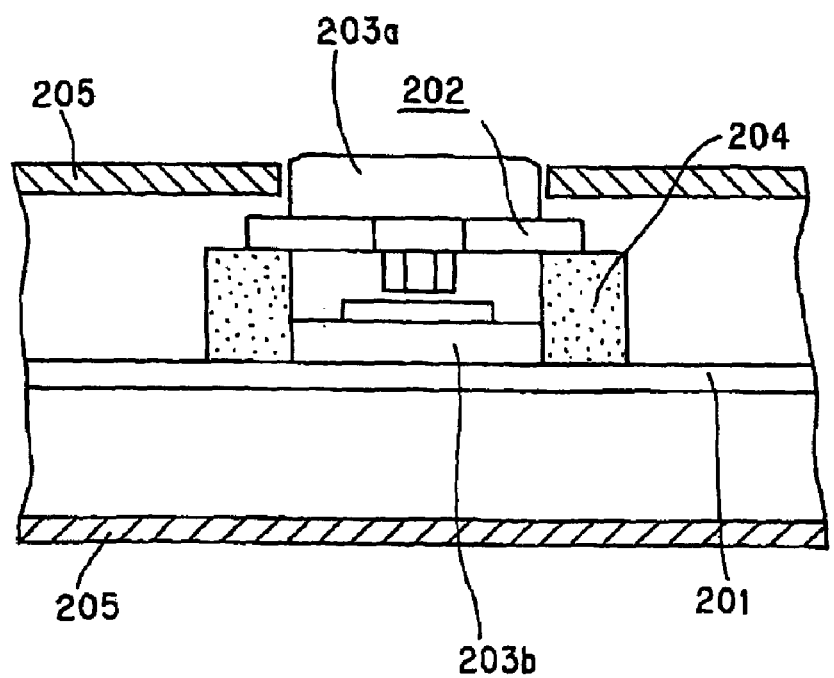
FIG. 2 is a cross-sectional view showing a second example of the conventional portable communication unit.
Figure 3:
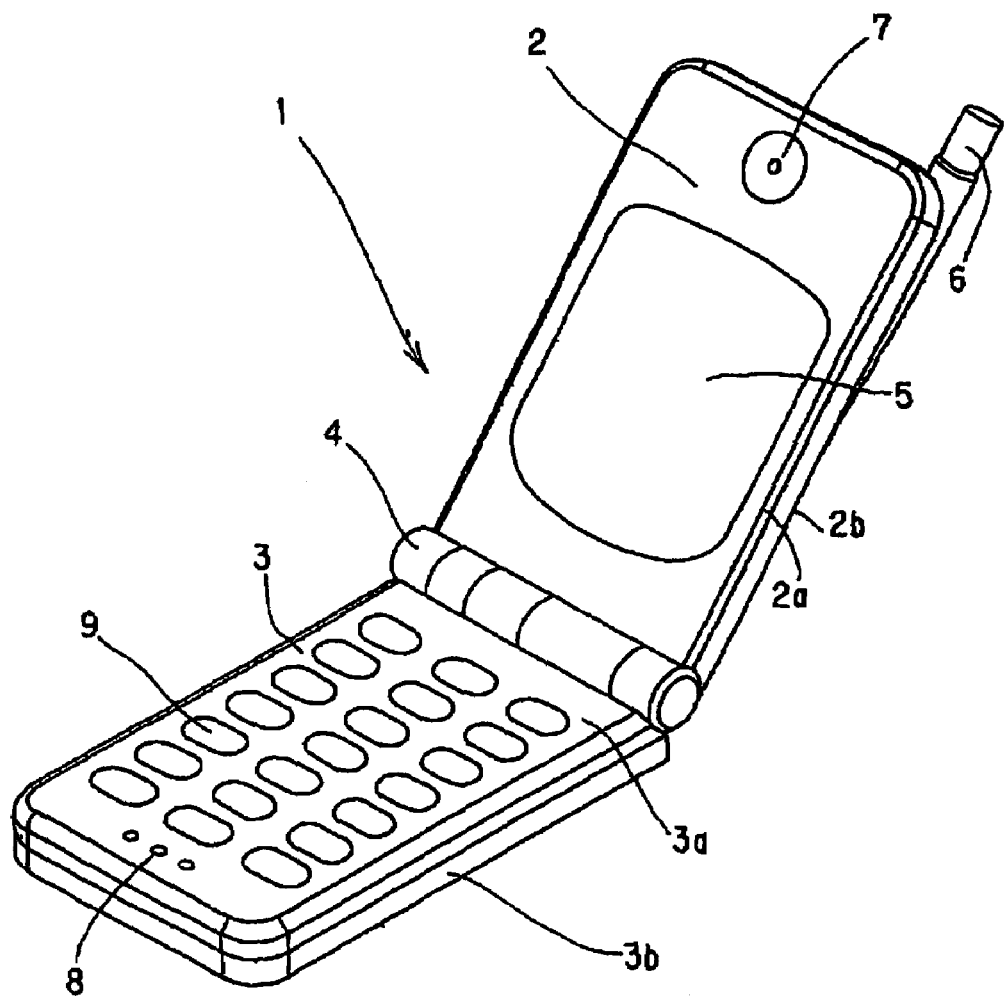
FIG. 3 is a perspective view showing the whole construction of the portable communication unit according to the invention.

FIG. 3 shows the whole construction of the portable communication unit according to the invention. Here a portable telephone will be exemplified as the portable communication unit.

A portable communication unit 1 has a folding structure, that is, is foldable in two, and comprises an upper body 2 and a lower body 3. The upper body 2 and the lower body 3 are coupled to each other by a hinge 4 so that they are rotatable at an angle between about 0 (zero) degree and 180 degrees. The upper body 2 comprises an upper case 2a and a lower case 2b. In the upper body 2, a display 5, an antenna 6, and a receiving part 7 are provided respectively at easy-to-use positions. The lower body 3 comprises an upper case 3a and a lower case 3b. A transmitting part 8 and a key operating part 9 are provided in this lower body 3. The key operating part 9 is used, for example, in the input (or store) of phone numbers or setting of functions (or execution of functions).

Figure 4:
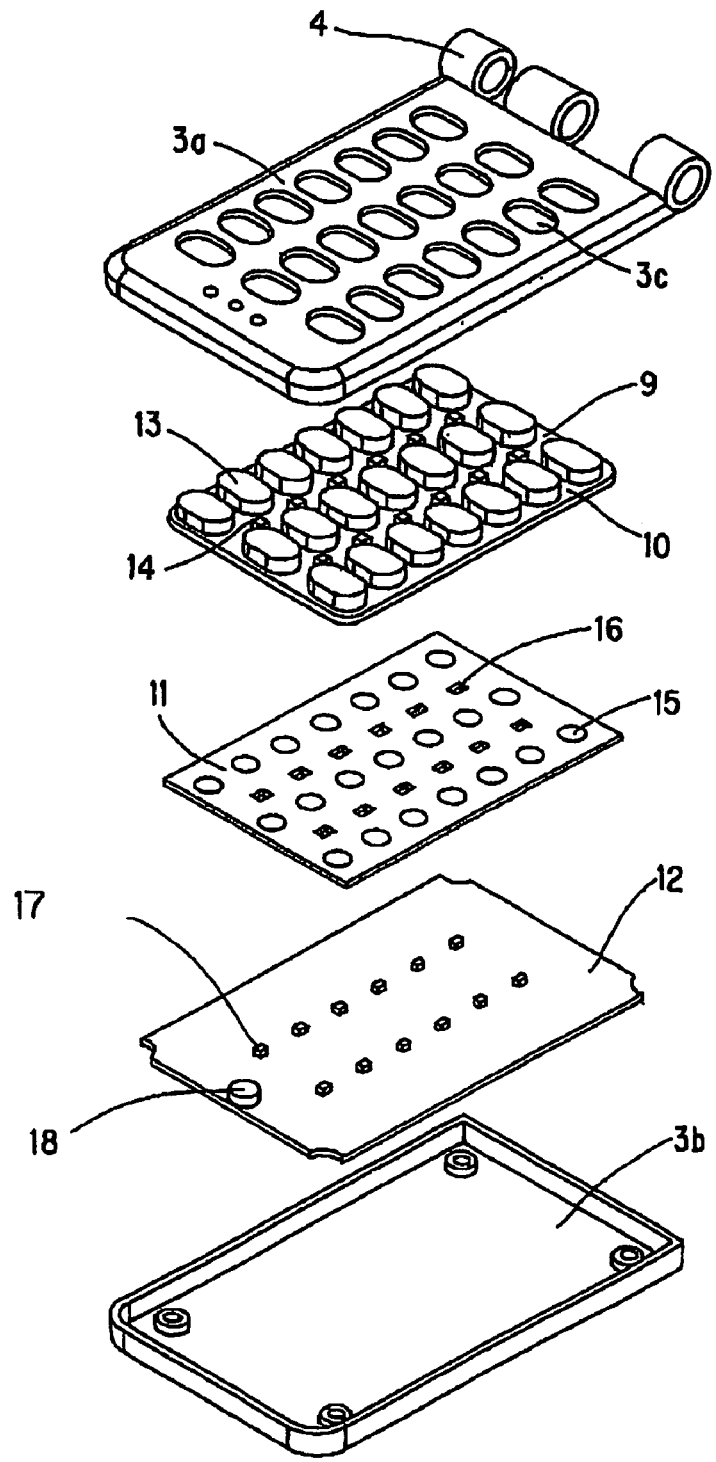
FIG. 4 is an exploded perspective view showing the details of a lower body shown in FIG. 3.
Figure 5:
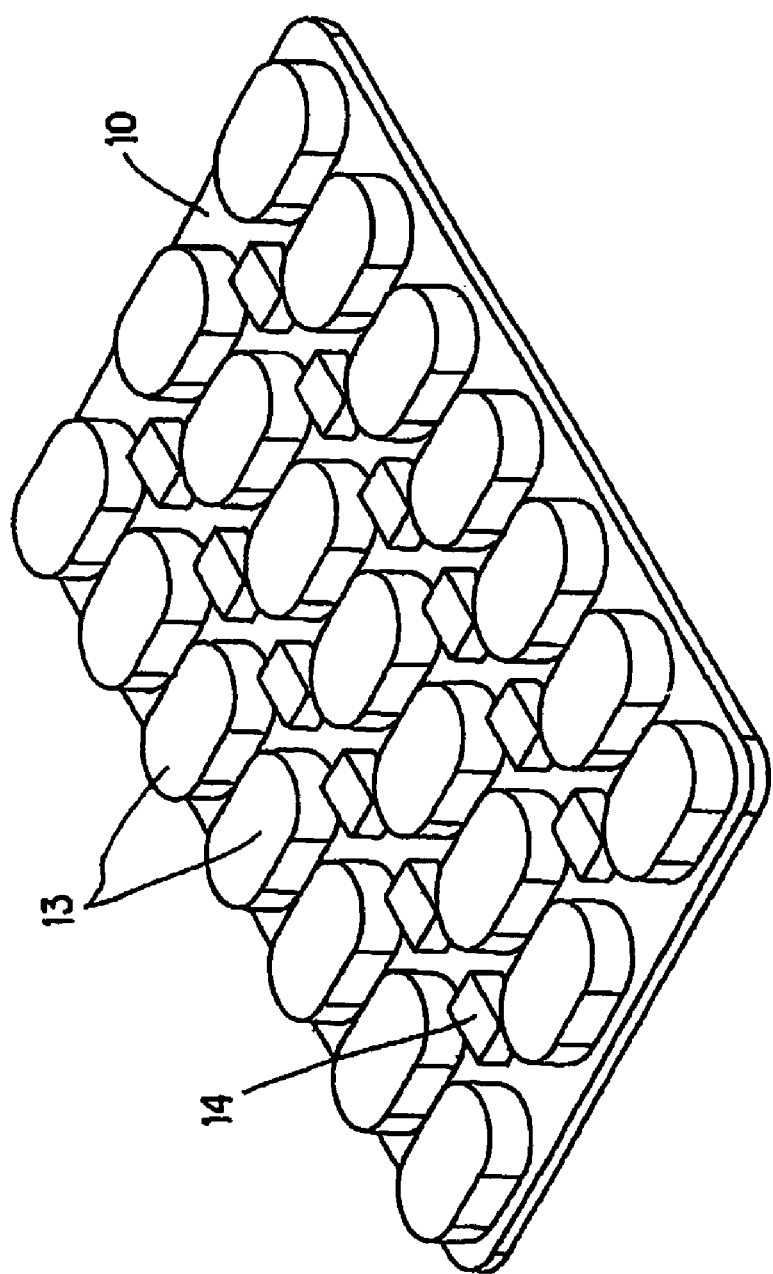
FIG. 5 is a perspective view showing the detailed construction of a key sheet shown in FIG. 4.

FIG. 4 shows the details of the lower body 3 shown in FIG. 3. FIG. 5 shows the detailed construction of a key sheet 10. A key sheet 10, a metal dome sheet 11, and a printed board 12 are incorporated in a stacked state into between the upper case 3a and the lower case 3b in the lower body 3. In the surface portion of the key sheet 10, buttons (keys) 13 (with a print or a seal of figures, symbols, function displays and the like provided on the surface thereof) are provided and exposed from openings 3c provided in the upper case 3a, and protrusions 14 are provided in a space between the buttons 13. The buttons 13 and the protrusions 14 in the key operating part 9 are molded using a resin or the like integrally with the key sheet 10. The protrusions 14 are provided for supporting the upper case 3a and thus preferably have a certain level of strength and hardness. The buttons 13 have a thickness large enough to have a hardness on a level such that, upon the depression of the button by a finger, the button neither collapses nor deforms.

The metal dome sheet 11 is prepared, for example, by press working of a metal plate or the like, vapor destination of a metal on an insulating plate, or pattern formation using a etching process. The metal dome sheet 11 is provided on the underside of the key sheet 10, and metal domes 15 are semicircularly formed at sites which face respective keys of the buttons 13. Further, the metal dome sheet 11 is provided with a plurality of openings 16 at sites which face a plurality of LEDs 17 on the printed board 12. In the printed board 12, a microphone 18 is provided as the transmitting part 8, and, in addition, LEDs 17 are provided so as to confront the openings 16. Upon depression of any button 13 in the key operating part 9, LEDs 17 emit light which functions as backlight of the buttons 13.

Figure 6:
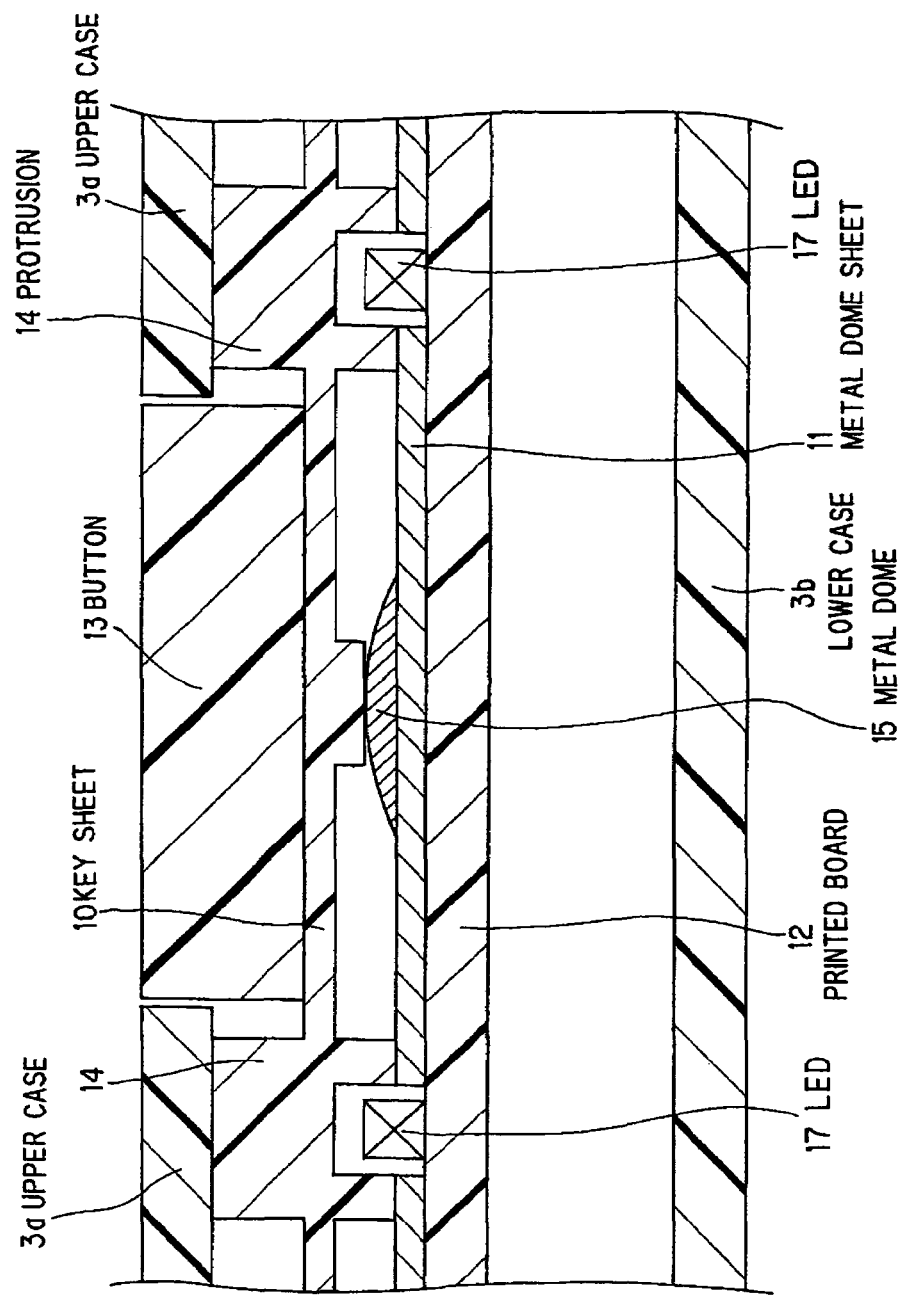
FIG. 6 is a cross-sectional view showing the sectional form of a principal part of the lower body.

FIG. 6 shows the sectional form of the lower body 3. Each of the protrusions 14 has a hollow structure, and the ceiling face (end on the upper case 3a side) is closed. LEDs 17 are internally fit respectively into the protrusions 14. The protrusions 14 each are preferably formed of a transparent or translucent material so that light emitted from LEDs 17 during energization reaches the buttons 13. The top face of the protrusions 14 is in contact with the backside of the upper case 3a. The metal domes 15 are provided so that they can come into contact with the respective buttons 13. Upon the contact of the top face of the metal dome 15 with the underside of the button 13, the switch is turned on.

In FIGS. 3 to 6, from a state such that the portable communication unit 1 is folded in two, the portable communication unit 1 is opened, that is, the upper body 2 is separated from the lower body 3 and is lifted upward to render the portable communication unit 1 usable (i.e., horizontal). In this state, upon the application of external pressure (external force) to the upper case 3a in the lower body 3, the upper case 3a is depressed and, as shown in FIG. 4, is abutted against the upper face of the protrusions 14 provided in the key operating part 9. Since the protrusions 14 are supported by the key sheet 10 and the printed board 12, the upper case 3a is supported by the protrusions 14, whereby the upper case 3a can be prevented from being deformed or curved. Therefore, unlike the prior art, there is no possibility that the key operating part 9 (i.e., buttons 13) is deformed by the deformation or curving of the upper case 3a. Since the key operating part 9 is not deformed, the metal domes 15 are not pressed.

Therefore, even when external pressure (external force) is applied to the case, erroneous operation of the key operating part 9 can be prevented. This improves the reliability of the portable communication unit 1. Further, by virtue of the provision of the protrusions 14, the upper case 3a is neither deformed nor curved. Therefore, the upper case 3a can be prevented from being broken by the external pressure, and here again the reliability of the portable communication unit 1 can be improved. Further, since the upper case 3a is not curved, a highly reliable portable communication unit can be provided without the use of any highly rigid material in the body and even when the wall thickness of the body is reduced.

Figure 7:
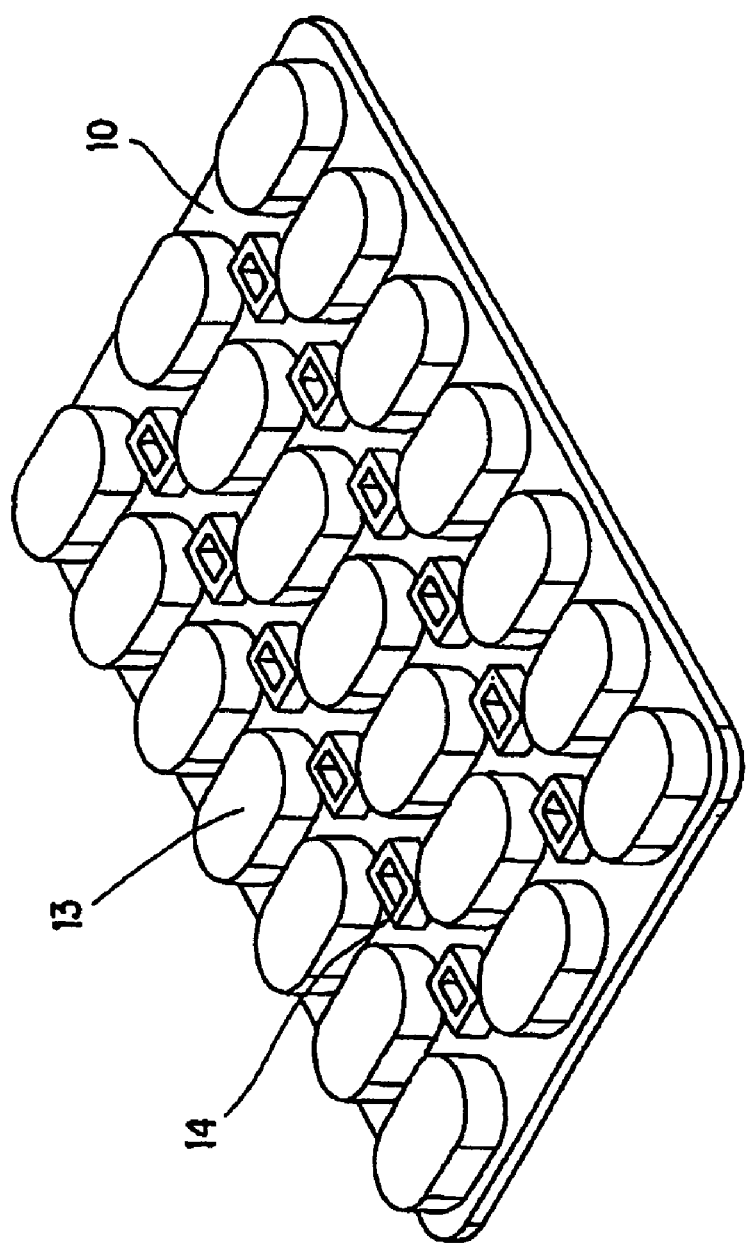
FIG. 7 is a perspective view showing another preferred embodiment of the construction of the key sheet according to the invention.

FIG. 7 shows another preferred embodiment of the construction of the key sheet 10. In FIG. 5, the protrusions 14 are in a hollow form, and the upper face is closed. Alternatively, as shown in FIG. 7, the protrusions 14 may be open ended, that is, the top and the bottom of the protrusions may be opened. According to this construction, light emitted from LEDs 17 can be guided to the upper case 3a without the attenuation of light, and, thus, a satisfactory quantity of light can be applied to the key operating part 9.

The construction of the protrusions 14 is not limited to that shown in FIGS. 5 and 7, and any shape, size, and arrangement may be adopted so far as the upper case 3a can be supported. For example, the shape is not limited to quadrangle as shown in FIGS. 5 and 7, and other shapes, such as cylindrical, triangular and polygonal shapes, may be adopted.

In the above preferred embodiments, the protrusions 14 provided on the key sheet 10 are provided in a space between the buttons 13. The construction, however, is not limited to this only, and the protrusions 14 may be provided at any site so far as the protrusions do not overlap with the metal domes 15. Further, the number of protrusions 14 used is not particularly limited.

Further, in the above preferred embodiments, the portable communication unit 1 has a twofold structure. However, it is needless to say that the invention can also be applied to a portable communication unit having a structure which cannot be folded.

Furthermore, in the above preferred embodiments, portable telephones are used as the portable communication unit. The invention, however, is not limited to the portable telephone and can also be applied to PHS (personal handyphone system), car telephones, and, further, PDA (personal digital assistant) equipment and portable equipment provided with a keyboard and operating buttons.

As described above, in the portable communication unit according to the invention, a plurality of protrusions are provided in a key sheet provided with a plurality of buttons, and the case in the body is supported by the plurality of protrusions. By virtue of this construction, even when external pressure is applied to the case, the case is neither deformed nor curved. Therefore, the buttons are not deformed, and erroneous key operation does not occur. Thus, a portable communication unit can be provided which can realize the protection of the body and electronic components against impact, external pressure and the like without the addition of a component or the use of a highly rigid material in the body, has reduced size and weight, and possesses improved reliability.

The invention has been described in detail with particular reference to preferred embodiments, but it will be understood that variations and modifications can be effected within the scope of the invention as set forth in the appended claims.

What is claimed is:

1. A portable communication unit comprising:
a body comprising an upper case and a lower case;
a key sheet, provided with a plurality of push buttons; and
a printed board;
said key sheet and said printed board being incorporated into the body, and said upper case comprising openings for exposing part of the plurality of push buttons;
said key sheet further comprising a plurality of protrusions of sufficient rigidity for supporting and preventing deformation of the upper case; and
wherein said protrusions protrude from opposite sides of said key sheet.

2. The portable communication unit according to claim 1, wherein the plurality of protrusions are provided in spaces between the plurality of push buttons.

3. The portable communication unit according to claim 1, wherein backlight LEDs are internally fit into the plurality of protrusions.

4. The portable communication unit according to claim 3, wherein the plurality of protrusions are hollow and are formed of a transparent or semi-transparent material and the upper part of each of the protrusions is closed.

5. A portable communication unit comprising:
a body comprising an upper case and a lower case;
a key sheet, provided with a plurality of push buttons; and
a printed board;
said key sheet and said printed board being incorporated into the body, and said upper case comprising openings for exposing part of the plurality of push buttons;
said key sheet further comprising a plurality of protrusions of sufficient rigidity for supporting and preventing deformation of the upper case;
wherein backlight LEDs are internally fit into the plurality of protrusions; and
wherein the plurality of protrusions have a hollow and cylindrical structure.

6. A portable communication unit comprising:
a body comprising an upper case and a lower case;
a key sheet, provided with a plurality of push buttons; and
a printed board;
said key sheet and said printed board being incorporated into the body, and said upper case comprising openings for exposing part of the plurality of push buttons;
said key sheet further comprising a plurality of protrusions supporting the upper case;
wherein said protrusions are disposed between the push buttons and are separate from one another; and
wherein the protrusions include an upper part which contacts the upper case and wherein the upper part is open.

7. The portable communication device according to claim 6, wherein the protrusions are hollow and have a quadrangle shape.

8. The portable communication unit according to claim 6, wherein LEDs are internally fit into the protrusions and provide light through the open upper part of the protrusions.

* * * * *